United States Patent [19]

Pocius et al.

[11] Patent Number: 4,521,490

[45] Date of Patent: Jun. 4, 1985

[54] TWO-PART EPOXY COMPOSITION

[75] Inventors: Alphonsus V. Pocius, Maplewood; William J. Schultz, Vadnais Heights, both of Minn.

[73] Assignee: Minnesota Mining and Manufacturing Co., St. Paul, Minn.

[21] Appl. No.: 522,419

[22] Filed: Aug. 11, 1983

[51] Int. Cl.$^3$ .............. B32B 15/08; C08L 75/04
[52] U.S. Cl. .................. 428/416; 428/418; 428/424.4; 428/425.8; 428/463; 524/751; 524/871; 524/874; 524/853; 525/65; 525/107; 525/108; 525/218; 525/454; 525/455; 525/524; 525/528; 525/529; 525/939
[58] Field of Search .............. 525/529, 113, 524, 528, 525/454, 939, 107, 108; 428/416, 418, 424.4, 428/425.8; 524/751, 871, 874, 853; 526/312; 528/68, 528/85

[56] References Cited

U.S. PATENT DOCUMENTS

| | | | |
|---|---|---|---|
| 2,604,464 | 7/1952 | Segall et al. | 260/80.5 |
| 2,662,870 | 12/1953 | Allenby | 260/45.5 |
| 3,065,195 | 11/1962 | Vasta | 260/41 |
| 3,247,288 | 4/1966 | Masters et al. | 260/837 |
| 3,310,603 | 3/1967 | Kelly | 260/837 |
| 3,316,185 | 4/1967 | Reinking | 260/2 |
| 3,316,195 | 4/1967 | Grosner et al. | 260/29.6 |
| 3,378,601 | 4/1968 | Tanaka et al. | 260/831 |
| 3,496,250 | 2/1970 | Czerwinski | 260/836 |
| 3,707,516 | 12/1972 | Walus | 260/21 |
| 3,816,557 | 6/1974 | Swanson et al. | 260/837 |
| 3,819,567 | 6/1974 | Swanson et al. | 260/42.28 |
| 3,833,683 | 9/1974 | Dickie et al. | 260/836 |
| 3,856,883 | 12/1974 | Dickie et al. | 260/836 |
| 3,864,426 | 2/1975 | Salensky | 260/837 |
| 3,894,112 | 7/1975 | Pagel | 260/830 |
| 3,943,187 | 3/1976 | Wu | 260/837 |
| 4,107,116 | 8/1978 | Riew et al. | 260/23 |

FOREIGN PATENT DOCUMENTS 904403  8/1962  United Kingdom .

OTHER PUBLICATIONS

N. C. Paul et al., "Polymer," 18, 9-1977, pp. 945-950.

Primary Examiner—Theodore E. Pertilla
Attorney, Agent, or Firm—Donald M. Sell; James A. Smith; Lorraine R. Sherman

[57] ABSTRACT

A solventless, fluid epoxy resin composition is storage-stable against separation of phases for at least one year, and when cured provides adhesive bonds of improved peel strength at room and low temperatures without loss of lap shear strength at room and elevated temperatures. The composition comprises an epoxide group-containing compound having in situ polymerized, elastomeric particles colloidally dispersed therein, and as curing agent a poly(oxyhydrocarbolene)diamine compound and optionally, and preferably, a cure accelerator.

17 Claims, No Drawings

TWO-PART EPOXY COMPOSITION

DESCRIPTION

1. Field of the Invention

This invention relates to a room temperature-curable epoxy composition having a polyoxyalkylenediamine compound as curing agent and to the cured epoxy resin produced therefrom. In a further aspect, this invention relates to a two-part composition suitable for admixing immediately prior to use to provide a curable epoxy adhesive composition.

2. Background Art

Epoxy resins, i.e., organic compounds having one or more terminal or pendent oxirane groups,

have been widely used for many years in compositions for making molded, cast, and potted products, and for coatings and adhesives because of the relative ease with which they can be converted to cured solid products that are strong and resistant to many chemical environments. Many cured epoxy resins having a high glass transition temperature are known to be brittle and tend to be susceptible to mechanical shock. When the epoxy resin is used as an adhesive this brittleness is generally manifested in low peel strength. To overcome this deficiency, plasticizers and flexibilizers have been introduced into the epoxy composition. U.S. Pat. No. 2,604,464, U.S. Pat. No. 2,662,870, U.S. Pat. No. 3,065,195, and U.S. Pat. No. 3,310,603 teach the addition of a polymer of various ethylenically-unsaturated monomers to form a solution of the polymer in the epoxy resin that on curing is flexibilized. U.S. Pat. No. 3,247,288, U.S. Pat. No. 3,378,601, and U.S. Pat. No. 3,943,187 teach the preparation of an epoxy resin solution that yields flexibilized products on curing that is made by the polymerization in a curable epoxy resin of various ethylenically-unsaturated monomers that give a polymer soluble in the uncured epoxy resin and in the cured epoxy resin. Coating compositions which are solutions of a graft polymer having a backbone segment of α,β-unsaturated monocarboxylic acid units and side chain segments of epoxy polyether dissolved in an organic solvent, as in U.S. Pat. No. 3,707,516, or in an epoxy resin as in U.S. Pat. Nos. 3,816,557 and 3,819,567, are also known. The above-described techniques for overcoming the brittleness of the cured epoxy resins have not been entirely satisfactory. The dissolved polymers cure to form a homogeneous copolymer with the epoxy resin which drastically effect desirable epoxy properties such as resistance to heat distortion, high modulus of elasticity and shear strength of adhesive bonds.

The incorporation of modifiers into epoxy resins, which are not soluble in the epoxy resins, to reduce their brittleness to shock is also known. Thus, U.S. Pat. No. 3,316,195 teaches the incorporation of a modifier component, which can be a latex of dispersed natural or synthetic rubber, into an epoxy resin to provide an aqueous coating composition from which coatings having enhanced flexibility and reduced brittleness can be prepared. U.S. Pat. No. 3,496,250 teaches the blending of an acrylonitrile butadienestyrene graft polymer into an epoxy resin to provide flexibility, shear strength, and impact characteristics to cured epoxy resin. These modified epoxy resins provide only moderate improvements in thermal/mechanical shock properties.

The brittle characteristics of epoxy resins have also been modified by the incorporation of an immiscible rubbery phase into the epoxy resin. Thus U.S. Pat. Nos. 3,833,683, 3,856,883, and 3,864,426 teach the incorporation of a graded rubber or core shell rubber particle into an epoxy resin followed by curing. The graded rubber particles are prepared by the emulsion polymerization of a crosslinked rubbery polymer followed by the addition of 25 to 50 percent of a high glass temperature, generally crosslinked, acrylate polymer. The glassy acrylate forms a protective shell around the rubbery core. The shell allows the drying or coagulation of these particles without coalescence. The resulting particles are then mechanically dispersed in epoxy resins. The shortcoming of this method is the unstable nature of the dispersed colloid in the resin. The dispersions are in a quasi-stable state where the coagulation and precipitation of the particle is retarded only by the high viscosity of the medium. An additional disadvantage is the relatively large mass of glassy shell material that is incorporated into the colloidal particle. This portion has little effect on the brittle characteristic of the epoxy resin but sometimes tends to build viscosities to unacceptable levels. Epoxy compositions modified with core-shell particles frequently provide only moderate improvements in the brittle characteristics of epoxy resins.

An alternative method of improving the mechanical and thermal shock characteristics of epoxy resins can be achieved by dissolving reactive elastomers in the epoxy resin which phase-separate during curing. The technique is exemplified by U.S. Pat. Nos. 4,107,116 and 3,894,112. In this technique the structure and form of the dispersed rubber phase in the cured article are controlled by the cure rate, type of curative, and cure temperature. The technique may work well for some cure systems but can be ineffective for others. Another disadvantage is that there is generally some plasticization of the epoxy by the incompletely phase-separated elastomer thus resulting in reduction in the heat deformation temperature.

Room temperature-curing epoxy resin compositions that cure to adhesive bonds having some peel strength at room and low temperatures (−50° C. or lower) and some retention of shear strength at room temperature are described by N. C. Paul, et al., "Polymer", 18 (9), 948 (1977).

Epoxy resin compositions, containing a reactive elastomer precursor, that yield adhesive bonds having a −55° C. T-peel strength of up to 130 N/25 mm (Newtons per 25 mm of width) (30 piw) are described in U.S. Pat. No. 3,894,112. These bonds, however, require that the composition be cured by heating at 250° C. for 60 minutes in contrast to the room temperature curing of applicant's composition.

Poly(oxyhydrocarbolene)diamines (i.e., glycol diamines) are known in the art and are used as a component of polyamides and polyurea/urethanes. U.S. Pat. No. 3,316,185 and British Pat. No. 904,403 disclose glycol diamines as flexibilizers in epoxy resins to provide desirable light color and no undesirable odor. However, epoxy resins cured by poly(oxyhydrocarbolene)diamines do not display high peel strength at room and low temperatures (down to −55° C.) without loss of high shear strength at room and elevated temperatures.

SUMMARY OF THE INVENTION

Briefly, the present invention provides a solventless, fluid epoxy resin composition that is storage-stable against separation of phases for at least one year, which resin when cured provides adhesive bonds of improved peel strength at room and low temperatures without loss of lap shear strength at room and elevated temperatures comprising a composition of at least one epoxide group-containing compound having in situ polymerized, elastomeric particles colloidally dispersed therein, and as curing agent a poly(oxyhydrocarbolene)diamine compound and optionally, and preferably, a cure accelerator.

The epoxy resin composition of the present invention is useful for providing substrates with a protective coating. In a preferred embodiment, the composition is useful for providing structural adhesives that cure to provide adhesive bonds having high lap shear strength at room and elevated temperatures but also high peel strength at temperatures down to at least −50° C., characteristics not found in commercial adhesives which generally have high lap shear strength at room and elevated temperatures but very low, if any, peel strength at low temperatures.

The method of providing the epoxy resin of the present invention is schematically shown in the Flow Chart below. The curable and cured epoxy compositions and methods therefor, but without inclusion of a poly(oxyhydrocarbolene diamine) curing agent, are disclosed in assignee's copending patent application U.S. Ser. No. 522,420, filed the same date as this application. The curing agent of the present invention provides surprising and superior properties in that by its use in the epoxy composition of the present invention, room temperature-curing compositions are obtained having improved retention of shear strength at room and elevated temperatures while providing improved peel strengths at room temperature and temperatures at least as low as −50° C., a combination of properties not known to be provided when used in prior art epoxies.

resulting in the elastomeric polymer forming a colloidal particle dispersed in the uncured epoxide compound and/or the cured epoxy resin;

"epoxide group-containing compound" is the term used herein to make reference to fluid organic compounds containing an oxirane group, i.e.,

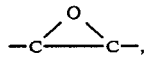

that can be cured by use of a curing agent and/or a catalyst to a "cured epoxy resin". In the trade, "epoxy resin" is a term that has been used sometimes to mean the uncured oxirane group-containing compounds and sometimes the cured oxirane group-containing products. Herein, the term epoxide group-containing compounds means an organic compound containing one or more epoxide or oxirane groups and includes the uncured fluid epoxy resins of the trade.

"lap shear strength" and "shear strength" mean strengths of adhesive bonds that are tested in shear. This test is described in detail in ASTM D 1002-72. "Shear strength" is directly related to modulus of elasticity and stiffness;

"T-peel strength" and "peel strength" mean the strength of an adhesive bond tested in a peel mode. "T-peel strength", described in ASTM D 1876-72, is related to fracture resistance and is related to resistance to mechanical and thermal shock.

"steric or entropic stabilization" means a solventless composition of colloidally-dispersed elastomeric particles in which there is a lack of coalescence, i.e., the stabilizer-attached elastomeric particles have greater attraction for the epoxy resin than for other stabilizer-attached elastomeric particles;

"colloidally-dispersed elastomeric particle" means particles having the properties of natural or synthetic rubber of less than 10 micrometer diameter, preferably 0.05 to 1.0 micrometer, of organic polymer, having a glass transition temperature, Tg, of less than 25° C. which are distributed uniformly in a dispersion medium, namely, in an epoxide group-containing compound;

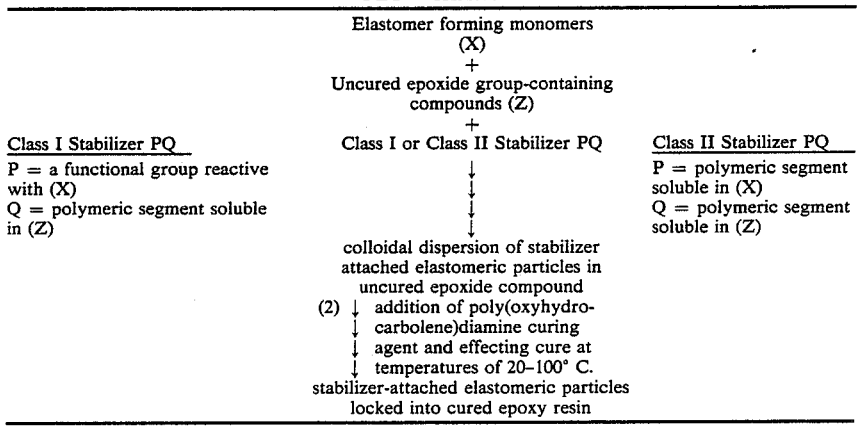

As used in this application.

"stabilizer-attached" means one end of the stabilizer compound has become attached, by means of absorptive, ionic, or covalent bonding, to the elastomeric polymer as it is formed from the monomer composition, "monomer composition" means a composition of a mixture of components at least one of which is polymerizable or crosslinkable to an elastomer having a Tg below 25° C.;

"abstractable or transferable proton" means a hydrogen that is removable from a first polymer, which hydrogen then terminates a growing second polymer chain, leaving a reactive site (e.g., a free radical site) on the first polymer where further polymerization can take place to form a graft (see subclass Ic Stabilizer); and "poly(oxyhydrocarbolene)diamine" means a compound having the formula:

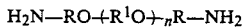   I wherein
R is a linear or branched chain alkylene group having 2 to 4 carbon atoms,
$R^1$ is an hydrocarbolene group having 2 to 8 carbon atoms selected from straight and branched chain alkylene groups having 2 to 4 carbon atoms, cycloalkylene groups having 4 to 8 carbon atoms, and arene groups having 6 to 8 carbon atoms, and
n is a number having a value of 1 to 10 such that the number average molecular weight of the curative agent is from 175 to 750, preferably 175 to 500.

DETAILED DESCRIPTION

The cured epoxy resin adhesive composition of the present invention has high peel strength at temperatures below −50° C., preferably as low as −55° C., and is the reaction product of a curable, colloidal, elastomeric particle-containing, epoxide group-containing composition and at least one of certain poly(oxyhydrocarbolene)diamines which comprises
(1) a curable composition comprising
  (a) 1.0 part by weight of curable epoxide group-containing compound (Z), and
  (b) 0.05 to 1.0 part by weight of colloidally-dispersed elastomeric particles that are insoluble in the epoxide group-containing compound and comprise
    (i) 75 to 98 percent by weight of an elastomeric polymer of one or more monomers (X) polymerized by in situ polymerization in the curable epoxide group-containing compound and being insoluble therein, and
    (ii) 25 to 2 percent by weight of a stabilizer having the formula PQ, in which
      Q is polymeric segment that has a molecular weight of at least 1000 and is soluble in the epoxide group-containing compound, and
      P is
        (a) a functional group covalently attached to Q and also becomes attached to the elastomeric particle during particle growth by formation of a covalent or ionic bond with the elastomeric particle, or
        (b) a polymeric segment that has a molecular weight of at least 1000 and that becomes absorbed into the elastomeric particle because it is soluble in the elastomeric polymer but insoluble in the epoxide group-containing compound, and
(2) a chemically effective amount of an epoxide curing agent comprising one or more poly(oxyhydrocarbolene)diamines having the general formula:

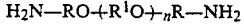   I wherein
R is a linear or branched chain alkylene group having 2 to 4 carbon atoms,
$R^1$ is an hydrocarbolene group having 2 to 8 carbon atoms selected from straight and branched chain alkylene groups having 2 to 4 carbon atoms, cycloalkylene groups having 4 to 8 carbon atoms, and arene groups having 6 to 8 carbon atoms, and
n is a number having a value of 1 to 10 such that the number average molecular weight of the curative agent is from 175 to 750; and
(3) optionally, a curing accelerator, with the provisos (a) that when $R^1$ is a branched chain alkylene the value of n is at least 5, and (b) that the ratio of curable composition to curing agent is such that there is present in the adhesive composition 0.75 to 1.1 equivalents of —NH group per equivalent of epoxide group.

More preferably, the epoxide curing agent is selected from poly(oxyhydrocarbolene)diamines within the scope of Formula I having the formulae:

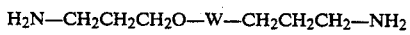   II wherein W is a divalent linking group selected from

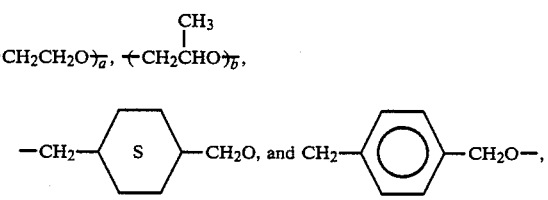

in which a is a number having a value from 1 to 5, and b is a number having a value from 4 to 10, and

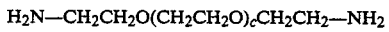   III wherein c is a number having a value from 4 to 10.

Most preferably, the poly(oxyhydrocarbolene)diamine epoxide curing agent of use in the composition of the invention has the general formula

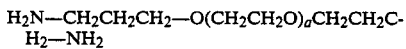

wherein a is a number having a value from 1 to 5.

Preferably, the epoxide group-containing composition of the invention is a two-part adhesive composition which is curable at room temperature, e.g., 20° to 25° C., to provide adhesive bonds when tested by modified ASTM Designation No. D1876-72 and D1002-72 as described below for FPL etched 2024 T-3 bare aluminum panels having a T-peel strength at −55° C. of at least 40 N/25 mm (10 piw), preferably at least 70 N/25 mm (16 piw), and most preferably at least 100 N/25 mm (25 piw); a T-peel strength at 24° C. of at least 130 N/25 mm (30 piw), and preferably at least 200 N/25 mm (45 piw); a lap shear at 24° C. of at least 30 MPa (4350 psi); and a lap shear at 82° C. of at least 2 MPa (300 psi).

When cure of the epoxide group-containing compound is effected with a poly(oxyhydrocarbolene)diamine having a weight average molecular weight of less than 175 the cured resin becomes too highly crosslinked causing a drop in peel strength. Also, when the weight average molecular weight of the poly(oxyhydrocarbolene)diamine is above about 500, the shear strength of adhesive bonds drops.

The process for providing the cured epoxy resin of the present invention comprises the steps of:

(1) providing a curable epoxide group-containing composition as defined above,
(2) adding to the epoxide group-containing composition an epoxide curing agent having the formula $$H_2N-RO+R^1O)_{n}RNH_2 \qquad I$$

wherein R, $R^1$, and n are as defined above, and
(3) maintaining the composition at a temperature of 20° to 100° C., for a length of time sufficient to effect curing.

Curable epoxide group-containing compounds (Z) which can be used in the composition of the invention are one or more mono- and polyglycidyl ethers or esters that are fluid at a temperature below 50° C., preferably below 30° C., selected from
(1) mono- and polyglycidyl ethers of mono- and polyhydric alcohols and phenols, and
(2) mono- and polyglycidyl esters of mono- and polycarboxylic acids.

Included are monomeric and polymeric compounds that can have an epoxy equivalency of from 1 to 6, preferably 1 to 3. Examples of useful epoxide group-containing compounds are glycidyl propionate, diglycidyl adipate, diglycidyl ether of 1,1-dimethylol-3-cyclohexane, triglycidyl ether of glycerol, diglycidyl ether of 2,5-bis(hydroxymethyl)tetrahydrofuran, butyl glycidyl ether, phenyl glycidyl ether, diglycidyl ether of bisphenol A, the diglycidyl ether of resorcinol, the triglycidyl ether of phloroglucinol, the product of p-xylene dichloride and bisphenol A and others, as named in "Handbook of Epoxy Resins", McGraw-Hill, Inc., 1967. Especially preferred are the diglycidyl ethers of bisphenol A (e.g., the reaction products of epichlorohydrin and bisphenol A) having an epoxy equivalent weight of about 175 to 5,000 or more such as DER ™ - 332 (diglycidyl ether of bisphenol A having an epoxy equivalent weight of 172 to 176, available from Dow Chemical Co.) and EPON ™ 828 (diglycidyl ether of bisphenol A having an epoxy equivalent weight of 185 to 191, available from Shell Chemical Co.).

The curable epoxide group-containing composition is a stable, colloidal dispersion of polymer particles, which particles are generally rubbery particles in epoxide group-containing compounds, and stabilizers therefor. In the process, a monomer (X), as defined below, that is soluble or dispersible in the epoxide compound but whose polymer is insoluble in the epoxide compound is polymerized in the presence of an entropic stabilizing compound that attaches itself to the surface of the growing colloidal particle and prevents flocculation, agglutination, and precipitation of the particle. The stabilizing compound can be a compound having one part that is soluble in the epoxide group-containing compound and another part that is reactive with or copolymerizable with the monomer forming a covalent bond for attachment to the growing colloidal particle. Alternatively, the stabilizing compound can be a compound having one part that is soluble in the epoxide compound and another part that is soluble in the growing colloidal particle and thus becomes attached by absorptive forces.

Monomer compositions (X) include both liquid and solid compounds that are soluble in the epoxide compound (Z) and also liquid compounds that are not soluble in the epoxide compound since these liquid compounds can readily be dispersed as very fine droplets by rapid stirring. Suitable compounds for use in the composition are compounds or mixtures of compounds having a reaction functionality that, when dissolved in an epoxide group-containing compound, can be polymerized to an elastomeric polymer under conditions that do not cause appreciable polymerization or reaction of the epoxide group. Preferably, the monomer composition comprises one or more ethylenically-unsaturated group-containing monomers or one or more diisocyanates and coreactive difunctional compounds that are curable to elastomeric polymers.

Although any of the ethylenically-unsaturated monomers that are polymerizable by free radicals may be used in the monomer composition, to obtain a suitably elastomeric polymer the monomers or mixtures of monomers used are selected such that on polymerization a polymer or copolymer is obtained that has a Tg below about 25° C. Preferable ethylenically-unsaturated monomers have the general formula:

$$H_2C=C-R^1$$
$$\phantom{H_2C=}|$$
$$\phantom{H_2C=}R$$

in which
R is hydrogen, methyl, or chlorine,
$R^1$ is halogen, $$-OR^2, -\underset{\underset{R^3}{|}}{N}\overset{\overset{O}{\|}}{C}-R^2, -C\overset{\overset{O}{\|}}{-}O-R^2, -\overset{\overset{O}{\|}}{C}\underset{\underset{R^3}{|}}{N}-R^2 \text{ or } -CN,$$

wherein
$R^2$ and $R^3$ are independently hydrogen, a straight- or branched-chain alkyl group having 1 to 18 carbon atoms, a 5- or 6-atom carbocyclic group having 5 to 18 carbon atoms, a straight- or branched-chain alkoxyalkyl group having 2 to 18 carbon atoms, or $R^3$ together with
$R^2$ and the —N— or $$-\overset{\overset{O}{\|}}{N}C-$$

to which they are attached form a 5- or 6-membered ring that can be further substituted by 1 to 4 lower alkyl groups ($C_1$ to $C_4$) or 1 benzo group.

For polymers of these monomers to have a Tg below about 25° C., at least 50 percent of the monomers used generally are monomers in which $R^2$ has 4 carbon atoms or more and the average number of carbon atoms in $R^2$ is from 4 to 8. It may also be desirable that there be present in the monomer composition from about 0.1 to 10 percent by weight of the total monomer composition of a crosslinking monomer. The crosslinking monomer can be any material having at least two polymerizable ethylenic groups. Preferably, the crosslinking monomer is a divinyl cyclic hydrocarbon, e.g., 1,4-divinylbenzene, divinylcyclohexane or a polyester of a polyhydric alcohol and acrylic or methacrylic acid, e.g., 3-oxapentamethylene diacrylate or dimethacrylate, pentamethylene diacrylate or dimethacrylate, ethylene diacrylate or dimethacrylate, trimethylol propane triacrylate or trimethacrylate, pentaerythritol tetracrylate or tetramethacrylate.

Suitable diisocyanates and coreactive difunctional compounds for use in the monomer composition (X) are any of the diisocyanates and coreaction diols, diamines, and alkanolamines that react to give polyurethanes, polyureas, or polyurethaneureas that have a glass transition temperature, Tg, below about 25° C. The compounds and process for preparing elastomeric polyurethane are well known (see, for example, Kirk-Othmer, "Encyclopedia of Chemical Technology", Vol. 21, second edition, Interscience Publishers, NY, page 94 et seq., 1970). Examples of preferred diisocyanates are aromatic diisocyanates such as 2,4-tolylene diisocyanate, 4,4'-methylenebis(phenylenediisocyanate) and 1,5-naphthalene diisocyanate. Other diisocyanates are the preferred aliphatic and alicyclic diisocyanates such as hexamethylene diisocyanate and isophorone diisocyanate.

Examples of diols that can be reacted with the diisocyanates are the polymeric diols and diol extenders that are conventionally employed in the art for the preparation of urethane elastomers. The polymeric diols are polyester diols, poly(oxyalkylene)diols in which the alkylene group has 2 to 4 carbon atoms, polyolefin diols, and polydiene diols having a molecular weight from about 400 to 4000. Such diols are well known in the art. Examples of the polyester diols (prepared from dicarboxylic acids having 4 to 18 carbon atoms and polyhydric alcohols having 2 to 18 carbon atoms) are poly(ethylene suberate)diol, poly(hexamethylene adipate)diol, and poly(caprolactone)diol. Examples of polyether diols (polymers containing aliphatic or cycloaliphatic groups, interrupted by O atoms) are poly(oxyethylene)diol, poly(oxypropylene)diol and poly(oxybutylene)diol. For other examples of polyester and polyether diols and how they are prepared see, for example, U.S. Pat. No. 4,169,196, which is incorporated herein by reference.

Preferably, the insoluble colloidally-dispersed elastomeric particles are selected from particulate polymers of ethylenically-unsaturated monomers and polyurethanes (monomer compositions characterized by —NH-COO— groups) that are insoluble in the curable epoxide compound and have a glass transition temperature of 25° C. or less. Most preferably, the colloidally-dispersed elastomeric particle comprises a copolymer of ethylenically-unsaturated monomers of which 75 to 98 percent by weight are selected from one or more ethylenically-unsaturated monomers whose polymer or copolymer is insoluble in the epoxide group-containing compound and 25 to 2 percent by weight is a stabilizer which is a copolymerizable ethylenically-unsaturated group-substituted polymer that has a molecular weight of at least 1000 and is soluble in the epoxide group-containing compound.

Extenders which can be employed in the polyurethane monomer composition can be any of the diol extenders commonly employed in the art such as ethylene glycol and butanediol. Other suitable examples are disclosed, for example, in U.S. Pat. No. 4,169,196.

The stabilizer required in the composition of the invention is a compound having two functionalities, a first functionality giving it solubility in the epoxide group-containing compound and a second functionality enabling the stabilizer to become attached to the elastomeric particle. A stabilizer with these functionalities can thus provide steric or entropic stabilization of the elastomeric particle against sedimentation or agglutination.

Suitable stabilizers, PQ, are compounds that can be classified into two different classes, both classes having in common a polymeric segment, Q, that has a molecular weight of at least 1000 and is soluble in the epoxide group-containing compound, and a group P.

Preferred examples of polymers which provide Q segments are copolymers of one or more of methyl and ethyl acrylate and methacrylate with about 1 to 5 percent by weight of a copolymerizable monomer having a reactive hydrogen-containing group (e.g., a hydroxyl, carboxyl, thiol, or amino group) or an isocyanate group; polymers of glycidyl ethers of mono- and polynuclear dihydric phenols, particularly the polymers of the glycidyl ether of bisphenol A having the formula

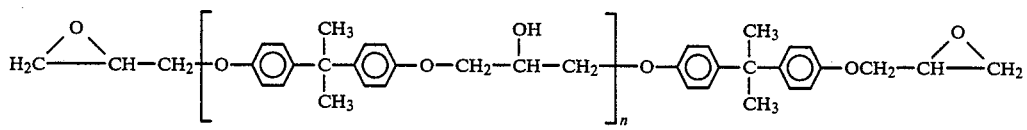

wherein n is a number having a value from 2 to 100; and polymers having an abstractable hydrogen atom, e.g., polyoxalanylene which has units with the structure

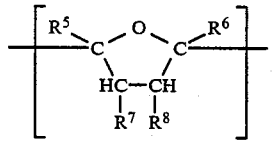

wherein $R^5$, $R^6$, $R^7$ and $R^8$ are individually hydrogen or alkyl groups containing up to 8 carbon atoms each, provided that at least one of $R^5$ and $R^6$ is hydrogen.

In the Class I Stabilizers having subclasses a, b, c, and d, P is a group copolymerizable with the monomer composition (X) or reactive with the growing polymer of the monomer composition (X). In the Class II Stabilizers, P is a polymeric segment that is soluble in the growing polymer of the monomer composition.

Class I Stabilizers can be any polymer having the necessary molecular weight and solubility characteristics and P is selected from Subclass (a) one or more reactive hydrogen-containing groups or isocyanate groups making them copolymerizable, respectively, with the diisocyanate or coreactive difunctional monomer composition. Examples of such stabilizers are the reactive hydrogen group-containing copolymers comprising methyl and ethyl acrylate with 0.1 to 10 mole percent of an hydroxyl-, carboxyl-, thio-, amino-, or amido-substituted alkyl acrylate or methacrylate, such as poly(98 percent methyl acrylate-co-2-percent 2-hydroxyethyl acrylate). In this polymer, the poly(methyl methacrylate) segments provide a molecular weight above 1000 and solubility in the epoxide group-containing compound;

Subclass (b) one or more ethylenically-unsaturated groups making them copolymerizable with the ethylenically-unsaturated monomer composition. Examples of such stabilizers are the reaction products of the reactive hydrogen group-containing polymers described in (a) above with acryloylating compounds such as acryloyl or methacryloyl chloride, acrylic or methacrylic anhydride, ω-isocyanatoalkyl acrylate or methacrylate and 2,3-epoxypropyl acrylate or methacrylate. An example of such a stabilizer is poly(98 percent methyl acrylate-co-2 percent acryloyloxyethylcarbamyloxyethyl methacrylate).

Subclass (c) an easily abstractable or transferable proton that leaves a polymeric free radical such as, for example, poly(2,5-oxolanylene) which is disclosed in U.S. Pat. No. 4,309,516 and incorporated herein by reference, poly(<50 percent butadiene-co->50 percent styrene), and poly(oxytetramethylene); and Subclass (d) an acid or basic group such as a carboxyl or an amino group. An example of such a stabilizer is a copolymer of methyl acrylate and 1 to 5 weight percent of acrylic acid.

When the elastomer is a polyurethane polymer, P of Stabilizer PQ can be either an isocyanate group or a reactive hydrogen-containing group so as to copolymerize with the polyurethane-forming monomers and thus attach Q to the polyurethane. When the elastomer is a copolymer of ethylenically-unsaturated monomers, P of Stabilizer PQ can be an ethylenically-unsaturated group so as to copolymerize therewith. When the elastomer is a copolymer of ethylenically-unsaturated monomers, P of Stabilizer PQ can be an easily extracted proton which, in the presence of peroxide, leaves a polymeric free radical on which the monomers become grafted. When the elastomer is a copolymer of ethylenically-unsaturated monomers, one of which has an acid or basic group (i.e., carboxyl or amino group), P of Stabilizer PQ can be a basic or acid group complementary to the acid or basic groups so as to ionically bond the stabilizer to the elastomer.

Class II Stabilizers are segmented polymers having both a polymeric segment Q, that is, as defined above for Class I Stabilizers and a polymeric segment P that has a molecular weight of at least 1000 and is soluble in the growing polymer of the monomer composition. Examples of such segmented polymers are those resulting from the polymerization of 1 part of an acryloylated active hydrogen group-containing polymer of methyl or ethyl acrylate (providing solubility in epoxide group-containing compounds as described under Class Ib Stabilizers) and 0.5 to 1.5 parts of alkyl acrylates in which the alkyl group has 4 carbon atoms or more and an average of 4 to 8 carbon atoms providing solubility in polymers of ethylenically-unsaturated monomers (elastomers).

Where the elastomeric particle is a polymer of an ethylenically-unsaturated monomer, the curable composition of the invention is prepared by mixing in a suitable reaction vessel the epoxide compound, one or more ethylenically-unsaturated monomers, the stabilizer, and 0.05 to 5.0 percent by weight of a free radical polymerization initiator based on total weight of ethylenically-unsaturated compounds. The vessel is flushed with inert gas, e.g., nitrogen, and the contents are then agitated vigorously. The reaction is then allowed to proceed while applying cooling or heat to maintain a controlled temperature from about 25° to 125° C. for 2 to 24 hours. Preferably, the temperature is maintained at 50° to 80° C. for 10 to 20 hours. Suitable sources of free radicals are the organic peroxides such as lauroyl peroxide or azobis(isobutyronitrile). Other sources of free radicals can be used as is well known in the art for polymerization of ethylenically-unsaturated compounds. Following the reaction, the composition is cooled to 25° C. and is ready for compounding, if desired, immediate use, or storage.

Where the elastomeric particle is a polyurethane, the composition of the invention is prepared by mixing in a suitable reaction vessel the epoxide, the stabilizer, the polyols and 0.95 to 1.05 equivalents of diisocyanates, and optionally a catalyst for urethane formation such as stannous octoate or other catalyst such as is known in the art. Vigorous agitation is employed. Generally, as the reactants are added to the epoxide compound, they dissolve, the temperature of the mixture rises, and particulate reaction product begins to form as is made evident by the mixture taking on a milky appearance. The temperature is allowed to climb and with added heat held at 75° to 125° C. until analysis indicates disappearance of the isocyanate group. The reaction is complete in less than 60 minutes.

The epoxy composition of the invention may be compounded, as is customary with epoxy compositions, by the addition of pigments such as carbon black and clay, silica, glass beads, glass fibers, coloring agents, antioxidants, plasticizers, flame retardants such as antimony trioxide, fillers, extenders and the like. From about 0.5 to 100 parts of additive per 100 parts of epoxy composition may be added.

The colloidal composition preferably contains 10 to 30 percent, more preferably 13 to 25 percent, by weight of colloidally-dispersed elastomer in the total weight of combined elastomer and curable epoxide group-containing compounds. At concentrations of elastomer below 10 percent, cured compositions become increasingly brittle and lose peel strength and above about 30 percent they lose shear strength.

In the present invention, poly(oxyhydrocarbolene)-diamines are used as the epoxide curing agent in the curable epoxide group-containing compositions of the invention and include compounds having the formulae:

| Compound No. | Structure |
| --- | --- |
| 1. | $H_2N-C_2H_4O(C_2H_4O)_2C_2H_4-NH_2$ |
| 2. | $H_2N-C_2H_4O(C_2H_4O)_4C_2H_4-NH_2$ |
| 3. | $H_2N-C_3H_6O(C_3H_6O)_5C_3H_6-NH_2$ |
| 4. | $H_2N-C_3H_6O-C_2H_4O-C_3H_6-NH_2$ |
| 5. | $H_2N-C_3H_6O(C_2H_4O)_2C_3H_6-NH_2$ |
| 6. | $H_2N-C_3H_6O(C_2H_4)_3C_3H_6-NH_2$ |
| 7. | $H_2N-C_3H_6O(C_2H_4O)_5C_3H_6-NH_2$ |
| 8. | $H_2N-C_3H_6O(C_2H_4O)_{10}C_3H_6-NH_2$ |
| 9. | $H_2N-C_3H_6O-C_4H_8O-C_3H_6-NH_2$ |
| 10. | $H_2N-C_3H_6O(C_3H_6O)_{10}C_3H_6$ |
| 11. | $H_2N-C_3H_6O-\langle S \rangle-OC_3H_6-NH_2$ |
| 12. | $H_2N-C_3H_6O-CH_2-\langle S \rangle-CH_2-OC_3H_6-NH_2$ |
| 13. | $H_2N-C_3H_6O-\langle O \rangle-OC_3H_6-NH_2$ |
| 14. | $H_2N-C_4H_8O(C_2H_4O)_3C_4H_8-NH_2$ |

In the above formulae, —C₃H₆— and —C₄H₈— are meant to include both the linear and various branched isomers of these structures.

The curing agent is present in 0.75 to 1.1 equivalents of —NH per epoxy equivalent weight and preferably in essentially stoichiometric amounts. Curing takes place at room temperature in about 6 hours to 7 days or longer.

It may be desirable to add a cocurative, which can be any curing agent known in the art, which may serve to improve certain properties, i.e., high temperature shear strength, of the cured material. Examples of cocuratives include 1,3-propane diamine and m-xylylene diamine. The cocurative can be present in the range of 0.05 to 20 mole percent of the curing agent.

Within the scope of the diamines of the present invention are the poly(oxyalkylene)diamines that are called "glycol diamines" in *Chemical Abstracts*. The fourth compound in the above list is given the name 3,3'-[oxybis-(2,1-ethanediyloxy)]bispropanamine.

Poly(oxyhydrocarbolene)diamines are prepared by several processes, a preferred process being the addition of a diol, e.g., a hydrocarbolenediol such as diethylene glycol (i.e., 2,2'-oxydiethanol), to acrylonitrile followed by reduction of the bisnitrile obtained to di(oxyethylene)dipropionamine as is taught in British Pat. No. 988,632, which patent is incorporated herein by reference.

More particularly, the liquid glycol diamines which are used as the curing agents for polyepoxide compositions can be conveniently prepared by cyanoalkylating a glycol having the general formula

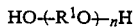

$$HO\text{---}(R^1O)_n\text{---}H$$

wherein $R^1$ and n are as previously defined, by reacting the glycol with at least two moles of acrylonitrile per mole of the glycol at a temperature of from 20° C. to 60° C. and in the presence of an alkali metal alkoxide such as sodium methoxide to form the corresponding cyanoalkylated compound. The cyanoalkylated compound is then hydrogenated at a temperature in the range of from 95° C. to 100° C. in the presence of nickel as a catalyst and at pressures on the order of 10.3 MPa (1500 p.s.i.g.). Suitable glycols having the formula previously given which can be cyanoalkylated with acrylonitrile include, among others, ethylene glycol, diethylene glycol, 1,2-propylene glycol, 1,3-propylene glycol and 1,4-butylene glycol. Illustrative of specific liquid glycol diamines suitable for purposes of this invention are di-(3-aminopropyl)ether of ethylene glycol, di-(3-aminopropyl)ether of 1,2-propylene glycol, di-(3-aminopropyl)ether of diethylene glycol, di-(3-aminopropyl)ether of triethylene glycol and di-(3-aminopropyl)ether of dipropylene glycol.

Preferably, the epoxide group-containing composition of the invention contains a curing accelerator in an amount up to about 15.0 percent, preferably about 5.0 to 12.0 percent by weight of the poly(oxyhydrocarbolene)diamine. The curing accelerator is an agent well known in the epoxy adhesive field for reducing the time required to bring about curing of the epoxy adhesive composition. Such agents are recognized as any hydrogen donating compound sufficiently acidic to donate hydrogen but not acidic enough to form a salt with the amino group of the curative amine. A further discussion of curing accelerators for epoxy resins is given by C. A. May and Y. Tanaka, "Epoxy Resins, Chemistry and Technology", Marcel Dekker, Inc., New York, 1973, page 146 et seq. Examples of curing accelerators include: water; alcohols, e.g., methanol and isopropanol; phenols, e.g., phenol and 2,4,6-tris(dimethylaminomethyl)phenol (DMP-30, Rohm and Haas Co.); ureas, e.g., urea, N-methyl urea; imidazoles, e.g., imidazole, 2-aminoimidazole, and 2-ethyl-4-methylimidazole; 5-amino-1,3,4-thiadiazole-2-thiol; and 6-amino-2-mercaptobenzothiazole.

Various other materials can be added to the composition to alter or even improve the characteristics of the cured adhesive including solvents, viscosity modifiers, filler, pigments, dyes, fibers, glass or plastic microbeads or bubbles, plasticizers and the like. Depending on the desired function of the additive, from traces to 100 percent or more by weight the additive based on the weight of epoxide group-containing compound in the composition may be used.

Generally, the composition of the invention is packaged for storage prior to use as a kit of two separated parts, Part A and Part B. Part B will contain the curable epoxide group-containing compound and the colloidally dispersed in situ polymerized elastomer particles and Part A will contain the epoxide curing agent of one or more poly(oxyhydrocarbolene)diamines and when used, the curing accelerator. The other additives can be incorporated into either Part A or Part B or in both parts. It is often desirable that a portion of the epoxide group-containing compound (e.g., up to about 25 weight percent) be prereacted with the curing agent and included in Part A to increase the viscosity of this part.

In the examples below, samples were evaluated by the tests described below. These are exemplary of adhesive performance. Different absolute values will be obtained with other adherends and test methods.

A. T-Peel Test

ASTM Standard Method of Test for PEEL RESISTANCE OF ADHESIVES (T-PEEL TEST) Designation D1876-72 was used following the recommended procedure with the following modifications.

(1) Flexible adherends were 2024 T3bare aluminum sheet 0.63 mm (25 mils) thick instead of the designated 0.81 mm (32 mils) thick cut to a width of 76 mm (3 in) and a length of 203 mm (8 in).

(2) Adherends were given an "FPL etch" (e.g. immersed in a sulfuric acid-chromic acid bath), rinsed with tap water, and dried.

(3) Components of the adhesive were weighed, then mixed by hand for two minutes until homogeneous and degassed by application of a vacuum.

(4) Laminated panels were prepared by spreading adhesive at a thickness of about 0.81 mm (32 mils) onto one adherend over an area of about 75 mm (3 in)×175 mm (6 in) leaving an uncoated area of about 50 mm (2 in)×75 mm (3 in). Spacers of 0.2 mm thickness were then placed along the length of the adherend and the second adherend superposed.

B. Lap Shear Test

ASTM Standard Method of Test for STRENGTH PROPERTIES OF ADHESIVES IN SHEAR BY TENSION LOADING METAL-TO-METAL) Designation D1002-72 was used with the following modifications.

(1) Adherends were 2024 T3 bare aluminum sheet 1.60 mm (63 mils) thick×102 mm (4.0 in) wide×178 mm (7.0 in) long.

(2) Adherends were cleaned as for the T-Peel test.

(3) Lap panels were prepared according to recommendations using adhesive mixed as for the T-Peel test and using as spacers glass thread of about 0.1 mm in diameter that was placed in the adhesive. The adherends were held in place by a short strip of tape placed about the sides of the overlap.

C. Procedure

The assembled test panels were stacked on a horizontal surface in the following order: (1) two laminated panels, (2) two 100 mm×200 mm sheets of metal weighing about 4.5 kg each, (3) two lap panels, and (4) one 100 mm×200 mm sheet of metal weighing about 4.5 kg. The metal sheets were used to apply pressure to the bonds. Below, above, and between the test panels, strips of cardboard were placed to insure even distribution of pressure on the test panels and release paper was used to prevent the panels from being bonded one to the other by adhesive that might be pressed from each assembly.

Objects and advantages of this invention are further illustrated by the following examples, but the particular materials and amounts thereof recited in these examples, as well as other conditions and details, should not be construed to unduly limit this invention.

Reference is made to the above-described T-Peel and Lap Shear tests in the following examples and appended claims by the name "APS" test.

EXAMPLE 1

Into a 500 ml reaction vessel equipped for distillation were placed 78 g EPON TM -828 (diglycidyl ether of bisphenol A having an epoxy equivalent weight of 185 to 191, hereinafter designated DGEBA, available from Shell Oil Co.) and 6.0 g Stabilizer A solution (2.0 g solids, prepared as described below). The vessel was evacuated and heated to distill tetrahydrofuran until the pot temperature reached 100° C. at a pressure of less than 1.0 Torr. The temperature was reduced to 25° C., the vacuum removed and 20 g hexyl acrylate and 0.1 g azobis(isobutyronitrile) were added. The distilling apparatus was replaced by an agitator. The vessel was flushed with nitrogen, the vessel contents vigorously agitated, and heated to 65° C. These conditions were maintained for 16 hours, after which a moderately viscous milky dispersion (designated SCD-1) was obtained.

Stabilizer A

Into a dry reaction flask there were placed 95 g of EPON TM 1009 (a bisepoxy reaction product of bisphenol A and epichlorohydrin having a molecular weight of 8080), 200 g tetrahydrofuran, and 5 g of 2-isocyanatoethyl methacrylate. The mixture was agitated and heated at 80° C. for five hours. The resulting solution contained 33.3 percent by weight of modified polymer having an average of 2.7 pendent methacrylic groups per polymer chain, a subclass Ib Stabilizer, identified as "Stabilizer A".

To 30 g of the above-described dispersion SCD-1 (containing 6 g of colloidally dispersed elastomer) was added 6.86 g diethyleneglycol bispropylamine (Compound 1, hereinafter designated DGBP) and 0.87 g imidazole (IMDZ) as curative accelerator. Test specimens were prepared as described above and stored at 22° C. for seven days, after which determinations were made of −55° C. and 24° C. T-Peel and 24° C. and 82° C. Lap Shear strengths.

In Table I is recorded the T-Peel and Lap Shear data and mean and standard deviations determined from 14 trials, each of which had two or more specimens.

TABLE I

| Adhesive Composition of SCD-1 and DGBP | | |
|---|---|---|
| Test | | |
| −55° C. T-Peel | 110 ± 44 N/25 mm | (29.3 ± 10 piw) |
| 24° C. T-Peel | 210 ± 39 N/25 mm | (47.3 ± 8.8 piw) |
| 24° C. Lap Shear | 33 ± 2 MPa | (4850 ± 322 psi) |
| 82° C. Lap Shear | 3 ± 1 MPa | (421 ± 110 psi) |

The data of TABLE I show that a composition of the invention provides bonds having −55° C. T-Peel strength consistently above 70N/25 mm (Newtons per 25 millimeters of width) with values as high as 150N/25 mm, 24° C. T-Peel strength above 170N/25 mm with values as high as 250N/25 mm, 24° C. Lap Shear consistently above 31 MPa and as high as 35 MPa, and 82° C. Lap Shear above 2 MPa.

EXAMPLES 2–16

Adhesive compositions were prepared and tested as described in Example 1 with the exception that an equivalent amount of the various diamine curatives listed in TABLE II were used in place of the 6.86 g of diethyleneglycol bispropylamine.

TABLE II

| Diamine curative $H_2N-C_3H_6O-W-C_3H_6-NH_2$ in which W is: | Physical Characteristics of Cured Adhesives | | | |
|---|---|---|---|---|
| | −55° C. T-Peel N/25 mm | 24° C. T-Peel N/25 mm | 24° C. Lap Shear MPa | 82° C. Lap Shear MPa |
| 2. a covalent bond | 0 | 8.9 ± 6.2 | 28 ± 1.4 | 3.4 ± 1.0 |
| 3. $+C_2H_4O+$ | 45 ± 0 | 160 ± 6 | 33 ± 2.0 | 4.6 ± 0.3 |
| 4. $+C_2H_4O+_2$ | 110 ± 44 | 210 ± 30 | 33 ± 2.8 | 3 ± 1 |
| 5. $+C_2H_4O+_3$ | 160 ± 6 | 190 ± 3 | 31 ± 0.1 | 3 ± 0.3 |
| 6. Equal amounts of 3. and 5. | 58 ± 19 | 200 ± 35 | 32 ± 0.4 | 2 ± 0.3 |
| 7. $+C_4H_8O+$ | 71 ± 38 | 160 ± 19 | 32 ± 4.4 | 3.7 ± 2.0 |
| 8. $+C_5H_{10}O+$ | 27 ± 11 | 66 ± 60 | 30 ± 2.9 | 2.8 ± 0.9 |
| 9. $+C_6H_{12}O+$ | 20 ± 5.8 | 6.7 ± 4.5 | 28 ± 3.0 | 2.2 ± 0.9 |
| 10. $-\langle S \rangle-O-$ | 13 ± 0 | 29 ± 22 | 27 ± 1.1 | 3.0 ± 0.1 |
| 11. $+CH_2-\langle S \rangle-CH_2O+$ | 37 ± 18 | 200 ± 71 | 31 ± 1.9 | 5.6 ± 2.7 |

TABLE II-continued

| Diamine curative $H_2N-C_3H_6O-W-C_3H_6-NH_2$ in which W is: | Physical Characteristics of Cured Adhesives | | | |
|---|---|---|---|---|
| | −55° C. T-Peel N/25 mm | 24° C. T-Peel N/25 mm | 24° C. Lap Shear MPa | 82° C. Lap Shear MPa |
| 12.  | 82 ± 22 | 130 ± 3 | 27 ± 3.6 | 3.6 ± 0 |
| 13. $+CH_2CHO+_{\overline{5.6}}$ with $CH_3$ | 100 ± 6.2 | 140 ± 32 | 30 ± 0 | 1.7 ± 0.2 |
| 14. $+CH_2CHO+_{\overline{2.6}}$ with $CH_3$ | 0 | 4.5 ± 0 | 21 ± 0.1 | 1.7 ± 0.1 |
| 15. $H_2N-C_2H_4O-C_2H_4O-C_2H_4-NH_2$* | 24 ± 2.7 | 55 ± 30 | 26 ± 1.0 | 6.4 ± 4.1 |
| 16. $H_2N-C_2H_4O+C_2H_4O+_{\overline{2}}C_2H_4-NH_2$* | 31 ± 6.2 | 111 ± 19 | 35 ± 0 | 2.9 ± 0.2 |

*the diamine curative is shown, not "W"

The data of TABLE II show that diamines in which the linking group, W, is $-C_2H_4O-$, $+C_2H_4O+_{\overline{2}}$, $+C_2H_4O+_{\overline{3}}$, $-C_4H_8O-$,

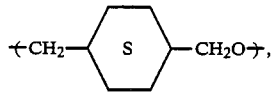

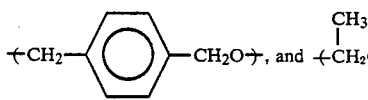, and $+CH_2CHO+_{5.6}$ with $CH_3$ all compounds within the generic definition of Formula I, provide adhesives having −55° C. T-Peel, 24° C. T-Peel, 24° C. Lap Shear, and 82° C. Lap Shear equal to or greater than 37N/25 mm, 130N/25 mm, 27 MPa, and 2 MPa respectively, all values equal to or above the requirements of the invention. The other amines either do not provide −55° C. T-Peel of at least 40N/25 mm or if they do it is with loss of 24° C. T-Peel strength to a value of less than 170N/25 mm or with loss of 24° C. Lap Shear to a value below 32 MPa.

EXAMPLES 17-21

To compare the bond strength obtained by prior art toughened epoxy adhesives containing various toughening agents with the bond strength obtained by the adhesive composition of the invention, compositions were prepared as described in EXAMPLE I using the same proportions of DGBP and IMDZ as used in EXAMPLE 1 with the exception that the prior art toughening agents listed in TABLE III (EXAMPLES 18-21) were used in place of the stabilized colloidal dispersion of EXAMPLE 1 (EXAMPLE 17). The results are given in TABLE III.

TABLE III

| Ex. No. | Reinforcing Material | −55° C. T-Peel N/25 mm | 24° C. T-Peel N/25 mm | 24° C. Lap Shear MPa |
|---|---|---|---|---|
| 17 | SCD-1 | 110 ± 40 | 210 ± 39 | 33 ± 2.7 |
| 18 | EPOTUF TM 98-426[a] | 107 ± 0 | 115 ± 11.6 | 25 ± 3.4 |
| 19 | Hycar TM CT-RLP 1300X8[b] | 108 ± 9.3 | 145 ± 18 | 27 ± 2.9 |
| 20 | Hycar CT-RLP 1300X15[c] | 62 ± 3.5 | 95 ± 17 | 33 ± 2.4 |
| 21 | Hycar CT-RLP 1300X13[d] | 130 ± 13 | 87 ± 7.6 | 30 ± 0.5 |

[a] an elastomeric copolymer modified epoxy resin available from Reichhold Chemicals Inc.
[b] a carboxy-terminated poly(82% butadiene-co-18% acrylonitrile) available from B. F. Goodrich Chemical Corp.; for further description of these CTBN modified epoxy resins see N. C. Paul et al., Polymer 18(9) 945-950 (1977).
[c] a carboxy-terminated poly(90% butadiene-co-10% acrylonitrile) available from B. F. Goodrich Chemical Corp.
[d] a carboxy-terminated poly(74% butadiene-co-26% acrylonitrile) available from B. F. Goodrich Chemical Corp.

The data of TABLE III show that the adhesives which have been prepared by curing the epoxide group-containing compound (e.g., DGEBA, the diglycidyl ether of bisphenol) to which a preformed elastomeric polymer had been added (e.g., an elastomeric copolymeric modified epoxy resin from Reichhold or one of three different carboxy-terminated butadiene-acrylonitrile copolymeric elastomers from Goodrich that have been prereacted with EPON TM 828 as described by N. C. Paul, et al., supra, at 150° C.) even when cured with a most preferred poly(oxyhydrocarbolene)diamine (e.g., DGBP, diethyleneglycol bispropylamine), yield cured epoxy resins providing adhesive bonds that when adequate peel performance is obtained a significant drop in shear strength is noted or when adequate shear strength is obtained a significant drop in peel performance is noted. The compositions of the invention demonstrates superior performance to the prior art in peel strength while maintaining high shear strength.

EXAMPLES 22 AND 25

To compare the bond strength obtained by epoxide adhesives containing "flexibilized" or "toughening" curing agents, e.g., elastomeric compounds containing reactive —NH groups with the bond strength obtained by the adhesive composition of the invention, the procedure of EXAMPLE 1 was repeated except that 6.0 g of amine terminated butadine-acrylonitrile liquid polymers were used in place of 6.0 g of colloidally dispersed elastomer, i.e., the solid-stabilized, colloidal-dispersed, in situ-polymerized acrylic elastomeric particles. TABLE IV gives the results of evaluations of the adhesive bonds.

TABLE IV

| Ex No. | Elastomeric Curing Agent | −55° C. T-Peel N/25 mm | 24° C. T-Peel N/25 mm | 24° C. Lap Shear MPa | 82° C. Lap Shear MPa |
|---|---|---|---|---|---|
| 22 | Hycar ™ ATBN 1300X16[e] | 32.5 ± 16.9 | 91.2 ± 31.6 | 32 ± 2.0 | 1.1 ± 0.5 |
| 23 | Hycar ™ ATBN 1300X10[f] | 11.7 ± 2.7 | 0 | 21.2 ± 8.6 | 1.7 ± 0.2 |
| 24 | Ancamide ™ 1636[g] | 0 | 0 | 2.6 ± 1.7 | 2.7 ± 0.7 |
| 25 | Genamide ™ 2000[h] | 18 ± 6.2 | 100 ± 19 | 28 ± 0.2 | 3.9 ± 0.8 |

[e]an amine-terminated poly(84% butadiene-co-16% acrylonitrile) having a total amine equivalent weight of 900 available from B. F. Goodrich Chemical Corp.
[f]an amine-terminated poly(90% butadiene-co-10% acrylonitrile) having a total amine equivalent weight of 1200 available from B. F. Goodrich Chemical Corp.
[g]an aliphatic polyamide having an —NH equivalent weight of 38 manufactured by Pacific Anchor Company.
[h]a polyamide having an —NH equivalent weight of 93.5 manufactured by Henkel Corporation.

The data of TABLE IV show that although the use of an elastomer curing agent having an amine equivalent weight of 900 gave adhesive bonds having a −55° C. T-Peel of 32N/25 mm, its 82° C. Lap Shear dropped to 1.2 MPa and when the elastomeric curing agent had an amine equivalent weight of 1200, the −55° C. T-Peel was only 11N/25 mm and 0° at 24° C. and shear performance was poor.

EXAMPLES 26–28

To illustrate the use of additional in situ produced colloidally dispersed particles in the adhesive compositions of the invention, three adhesive compositions were prepared according to the procedure of EXAMPLE 1 using in place of 20 parts of hexyl acrylate: in EXAMPLE 26, 18 parts of hexyl acrylate and 2 parts of methyl methacrylate (the dispersion was designated SCD-2); in EXAMPLE 27, 18 parts of hexyl acrylate and 2 parts of isooctylacrylate (the dispersion obtained was designated SCD-3); and in EXAMPLE 28, 16 parts of hexyl acrylate and 4 parts of isooctyl acrylate (the dispersion obtained was designated SCD-4). The results obtained in evaluating the adhesive bonds using these compositions are given in TABLE V below.

TABLE V

| Ex no. | Epoxy resin containing colloidal elastomer | −55° C. T-peel N/25 mm | 24° C. T-peel N/25 mm | 24° C. Lap shear MPa | 82° C. Lap shear MPa |
|---|---|---|---|---|---|
| 26 | SCD-2 | 160 ± 15 | 245 ± 12 | 37 ± 1.0 | 3.0 ± 0.5 |
| 27 | SCD-3 | 180 ± 26 | 280 ± 23 | 34 ± 2.0 | 2.4 ± 0.7 |
| 28 | SCD-4 | 120 ± 48 | 255 ± 60 | 35 ± 2.2 | 3.2 ± 0.5 |

The data of TABLE V show that the adhesive compositions of EXAMPLES 26–28, by virtue of their properties and composition, fall within the scope of the present invention and far exceeded the performance of the prior art materials described in EXAMPLES 19–23.

EXAMPLES 29–30

Adhesive compositions were prepared using 30 g of the stabilized colloidal dispersion SCD-3, obtained in accordance with the procedure of EXAMPLE 1 from 78 parts of diglycidyl ether of bisphenol A, 18 parts of hexyl acrylate, 2 parts of isooctyl acrylate, and 2 parts of the Stabilizer A of EXAMPLE 1 and the various amounts of diethyleneglycol bispropylamine and imidazole shown in TABLE VI below. The results obtained in evaluating adhesive bonds using these compositions are given in TABLE VI.

TABLE VI

| Component | Ex. No. 29 | Ex. No. 30[j] | Ex. No. 31 |
|---|---|---|---|
| DGBP, g | 5.49 | 6.86 | 7.55 |
| IMDZ, g | 0.69 | 0.87 | 0.95 |
| ratio[i] amine/epoxide | 0.8 | 1.0 | 1.1 |
| −55° C. T-Peel, N/25 mm | 45 ± 12 | 180 ± 26 | 100 ± 25 |
| 24° C. T-Peel, N/25 mm | 200 ± 9.4 | 280 ± 23 | 270 ± 12 |
| 24° C. Lap Shear, MPa | 33 ± 0.1 | 34 ± 2.0 | 32 ± 0.4 |
| 82° C. Lap Shear, MPa | 3.8 ± 0.1 | 2.4 ± 0.7 | 2.3 ± 0.4 |

[i]ratio of the equivalents of amine hydrogen to epoxide groups in the adhesive composition
[j]the composition EXAMPLE 30 was the same as EXAMPLE 27

Examples 29–31 show that the use of more or less curative than the amount that provides one amine hydrogen for one equivalent of epoxide caused a drop in the −55° C. T-Peel as well as a drop in both the 24° C. T-Peel and 24° C. Lap Shear characteristics of the adhesive. However, these values remained within the definition of the invention.

EXAMPLES 32 AND 33

An adhesive composition containing filler and "cocurative" was prepared by mixing 190 parts of SCD-1, as prepared in EXAMPLE 1, with 10 parts of Epon ™ 828, 3.9 parts of Degussa aluminum oxide C and 2.1 parts of fumed silica (TC 200 manufactured by Degussa Company). Thirty grams of this filled composition were mixed with the materials given in TABLE VII. Adhesive bond evaluation specimens were then prepared as described above and allowed to cure at room temperature for seven days. The bond evaluation data are given in TABLE VII.

TABLE VII

| Components | Ex. no. 32 | Ex. no. 33 |
|---|---|---|
| adhesive composition, g | 30 | 30 |
| diethyleneglycol bispropylamine, g | 5.76 | 5.62 |
| 1,3-propanediamine, g | 0.34 | — |
| m-xylenediamine, g | — | 0.70 |
| imidazole, g | 0.68 | 0.70 |
| fumed silica[k], g | 0.13 | 0.28 |
| Results of Evaluation | | |
| −55° C. T-Peel, N/25 mm | 113 ± 3.1 | 85 ± 13 |
| 24° C. T-Peel, N/25 mm | 210 ± 38 | 240 ± 6.2 |
| 24° C. Lap Shear, MPa | 37 ± 0.2 | 37 ± 0.7 |
| 82° C. Lap Shear, MPa | 3.3 ± 0.8 | 2.8 ± 0.3 |

[k]Cab-O-Sil ™ EH-5 (Cabot Corp.)

The data of TABLE VII show that the cocuratives used (within the scope of the invention) provided cured epoxide resins with adhesive bond strengths within the present invention. In addition, the EXAMPLES show that certain types of fillers and modifiers could be added to the adhesive and properties within the scope of the present invention were still maintained.

EXAMPLE 34

To illustrate the use of a "prereacted" curing agent, 144.2 parts of diethyleneglycol bispropylamine and 37.6 parts of the diglycidyl ether of bisphenol A were placed in a reaction vessel, stirred, and heated to 100° C. The mixture was allowed to react at this temperature for 3 hours, after which time 18.19 parts of imidazole curative accelerator was added and allowed to dissolve.

Ten parts of the prereacted curing agent were added to 30 parts of a stabilized colloidal dispersion, prepared as described in EXAMPLE 1 to contain 6.75 parts of in situ polymerized elastomeric copolymer of 80 percent hexyl acrylate to 20 percent isooctyl acrylate, 0.675 parts of the dispersion stabilizer of EXAMPLE 1, and 22.575 parts of the diglycidyl ether of bisphenol A. Adhesive bonds were prepared and tested as described above. The −55° C. T-Peel was 200±82N/25 mm, the 24° C. T-Peel was 270±12N/25 mm, the 24° C. Lap Shear was 30.5±0.2 MPa, and the 82° C. Lap Shear was 3.3±0.4.

When the procedure of this Example was repeated using 10 parts of the prereacted curing agent in 30 parts of a stabilized colloidal dispersion that contained 6.75 parts of in situ polymerized elastomer polymer of hexyl acrylate, 0.54 parts of the same dispersion stabilizer as above, and 22.71 parts of DG EBPA, the adhesive bonds exhibited a −55° C. T-Peel of 235±17N/25 mm, a 24° C. T-Peel of 290±3.1N/25 mm, a 24° C. Lap Shear of 32.6±0.1, and a 82° C. Lap Shear of 4.0±0.4.

EXAMPLES 35–37

To illustrate the use of various amounts of colloidal elastomeric particles in the composition of the invention, mixtures of components shown in TABLE VIII were prepared to contain 12.2, 19.5, and 21.8 percent by weight of colloidal elastomeric particles, respectively. The composition of EXAMPLE 35 was prepared by diluting the dispersion SCD-4 of EXAMPLE 28 with EPON TM 828 to provide a composition of 12.2 percent elastomer. The compositions of EXAMPLE 36 and 37 were prepared as described in EXAMPLE 28, using, however, sufficiently less EPON TM 828 to obtain compositions having 19.5 and 21.8 percent colloidal elastomer respectively. To 30 g of each composition was added the amounts of curative diethyleneglycol bispropylamine, DGBP, and curative accelerator, IMDZ (imidazole) shown. With each composition adhesive bonds were prepared and evaluated as described above, and the results are given in TABLE VIII below.

TABLE VIII

| | Ex. no. | | |
|---|---|---|---|
| | 35 | 36 | 37 |
| Components (% by weight) | | | |
| EPON TM 828 | 59.9 | 58.6 | 56.6 |
| Colloidal elastomer | 12.2 | 19.5 | 21.8 |
| Stabilizer | 1.2 | 1.9 | 2.2 |
| DGBP, curative | 23.7 | 17.7 | 17.2 |
| IMDZ, accelerator | 3.0 | 2.2 | 2.2 |
| Evaluation | | | |
| −55° C. T-Peel, N/25 mm | 84.5 ± 18.7 | 110 ± 18.2 | 160 ± 100 |
| 24° C. T-Peel, N/25 mm | 230 ± 25 | 230 ± 9.3 | 165 ± 110 |
| 24° C. Lap Shear, MPa | 34 ± 0.3 | 32 ± 1.4 | 32 ± 1.3 |
| 82° C. Lap Shear, MPa | 2.4 ± 0.2 | 3.2 ± 0.3 | 2.3 ± 0.1 |

The data of TABLE VIII show that variation of the amount of elastomer from about 12 to more than 20 percent of the total composition gave adhesives whose performance in a metal-to-metal bond was within the scope of the invention.

Various modifications and alterations of this invention will become apparent to those skilled in the art without departing from the scope and spirit of this invention, and it should be understood that this invention is not to be unduly limited to the illustrative embodiments set forth herein.

We claim:

1. An epoxy resin composition comprising:
   a. a curable epoxide group-containing compound having one or more oxirane groups,
   b. in-situ polymerized, colloidally-dispersed, elastomeric particles insoluble in said epoxide group-containing compound, said elastomeric particles comprising a polymer having a glass transition temperature of 25° C. or less and is selected from polymers derived from at least one of (1) ethylenically-unsaturated group-containing monomers and (2) diisocyanates and coreactive difunctional compounds that are curable to elastomeric compounds, and
   c. a poly(oxyhydrocarbolene)diamine compound as curing agent.

2. The epoxy resin composition according to claim 1 wherein said composition, when tested by the "APS" Test, provides a bond that has a T-Peel strength at −55° C. of at least 40N/25 mm, T-Peel strength at 24° C. of at least 170N/25 mm, Lap Shear strength at 24° C. of at least 30 MPA, and Lap Shear strength at 82° C. of at least 2 MPa.

3. The composition according to claim 1 further comprising an epoxy composition curing agent as cocurative.

4. The composition according to claim 3 wherein said cocurative is present in an amount in the range of 0.05 to 20 mole percent of said curing agent.

5. A solventless, fluid two-part composition of matter capable of curing to an epoxy adhesive resin, said two-part composition disposed in a package with the parts of the composition stored in separate compartments in the package, said parts being capable of being mixed when the composition is to be applied, comprising:
   a. in one part
      (1) a curable composition of matter comprising:
         (a) 0.75 to 1.0 part by weight of curable epoxide group-containing compound having one or more oxirane groups, and
         (b) 0.05 to 1.0 part by weight of colloidally dispersed elastomeric particles that are insoluble in the epoxide group-containing compound, comprising
            (i) 75 to 98 percent by weight of an elastomeric polymer of one or more monomers polymerized in situ in said epoxide group-containing compound, said polymer being insoluble in said epoxide group-containing compound, said polymer having a glass transition temperature of 25° C. or less and being selected from polymers derived from at least one of (1) ethylenically-unsaturated group-containing monomers and (2) diisocyanates and coreactive difunctional compounds that are curable to elastomeric compounds, and (ii) 25 to 2 percent by weight of a stabilizer having the formula PQ, in which Q is a polymeric segment that has a molecular weight of at least 1000 and is soluble in said epoxide group-containing and P is selected from (a) a functional group covalently attached to Q and also becomes attached to the elastomeric particle during particle growth by formation of a covalent or ionic bond with the elastomeric particle, and (b) a polymeric segment that has a molecular weight of at least 1000 and that becomes absorbed into the elastomeric particle because it is soluble in said elastomeric polymer of said monomer composition but insoluble in said epoxide group-containing compound, and b. in a second part (1) 0 to 0.25 part of said curable epoxide group-containing compound described under (a)(.1)(a) above, (2) a chemically effective amount of at least one epoxide curing agent comprising at least one poly(oxyhydrocarbolene)diamine having the formula:

$$H_2N-RO(R^1O)_nRNH_2 \qquad I$$

wherein

R is a linear or branched chain alkylene group having 2 to 4 carbon atoms, $R^1$ is an hydrocarbolene group having 2 to 8 carbon atoms selected from straight and branched chain alkylene groups having 2 to 4 carbon atoms, cycloalkylene groups having 4 to 8 carbons, and arene groups having 6 to carbon atoms, and n is a number having a value of 1 to 10 such that the number average molecular weight of said curing agent is from 17 to 750; and with the provisos (i) that when $R^1$ is a branched chain alkylene the value of n is at least 5, and (ii) that the ratio of said curable composition to said curing agent is such that there is present in the adhesive composition 0.75 to 1.1 equivalents of —NH group per equivalent of epoxide group and (3) optionally, a curing accelerator; and upon mixing, said composition being capable of providing as determined by the "APS" Test, a cured epoxy resin having T-Peel strength at −55° C. of at least 40N/25 mm, T-Peel strength at 24° C. of at least 170N/25 mm, Lap Shear strength at 24° C. of at least 30 MPa, and Lap Shear strength at 82° C. of at least 2 MPa.

6. The composition according to claim 5 wherein said poly(oxyhydrocarbolene)diamine curing agent has the formula:

$$H_2N-CH_2CH_2CH_2O-W-CH_2CH_2CH_2-NH_2$$

wherein W is a divalent linking group selected from

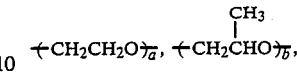

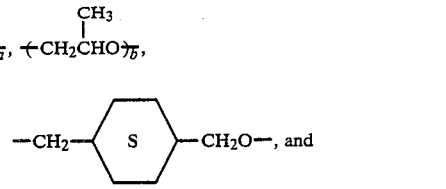

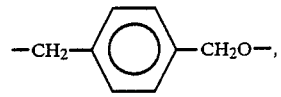

in which a is 1 to 5, and b is 4 to 10.

7. The composition according to claim 5 wherein said poly(oxyhydrocarbolene)diamine curing agent has the formula:

$$H_2N-CH_2CH_2O(CH_2CH_2O)_cCH_2CH_2-NH_2$$

wherein c is 4 to 10.

8. The composition according to claim 7 wherein said curing agent is selected from the class consisting of diethyleneglycoldipropionamine, triethyleneglycoldipropionamine, and tetraethyleneglycoldipropionamine.

9. The composition according to claim 5 wherein said curable epoxide group-containing compound is selected from the mono- and polyglycidyl ethers of (1) mono- and polyhydric alcohols and phenols, and (2) mono- and polyglycidyl esters of mono- and polycarboxylic acids that are fluid at a temperature below 50° C.

10. The composition according to claim 9 wherein said epoxide group-containing compound is a diglycidyl ether of bisphenol A.

11. The cured composition according to claim 5.

12. The composition according to claim 1 further comprising a curing accelerator.

13. The composition according to claim 12 wherein said curing accelerator is present in an amount of 0.05 to 15 weight percent based on the weight of the curing agent.

14. An article comprising a substrate and a layer of the cured composition according to claim 5 on at least one surface thereof.

15. A laminate comprising a layer of the cured composition according to claim 5 sandwiched between two substrates.

16. The composition according to claim 1 wherein said coreactive difunctional compound of paragraph (b)(.2) is a diol, diamine, or alkanolamine.

17. The two-part composition according to claim 5 wherein said coreactive difunctional compound of paragraph (a)(.1)(b)(i) is a diol, diamine, or alkanolamine.

* * * * *